(12) United States Patent
Yu

(10) Patent No.: US 6,840,524 B2
(45) Date of Patent: Jan. 11, 2005

(54) SCOOTER HAVING RECIPROCATING PEDALS

(75) Inventor: Hui-Nan Yu, Taoyuan (TW)

(73) Assignee: Hsin-Cheng Liao, Taoyuan (TW)

( * ) Notice: Subject to any disclaimer, the term of this patent is extended or adjusted under 35 U.S.C. 154(b) by 119 days.

(21) Appl. No.: 10/356,891

(22) Filed: Feb. 3, 2003

(65) Prior Publication Data

US 2004/0150179 A1 Aug. 5, 2004

(51) Int. Cl.⁷ .............................................. B62M 1/00
(52) U.S. Cl. ................... 280/87.041; 280/220; 280/228; 280/252
(58) Field of Search ................ 280/87.041, 87.021, 280/228, 282, 220, 221, 87.05, 241, 270, 210, 252; 440/30, 31; 482/66, 70

(56) References Cited

U.S. PATENT DOCUMENTS

| | | | | |
|---|---|---|---|---|
| 1,014,279 A | * | 1/1912 | Auger | 280/221 |
| 1,614,086 A | * | 1/1927 | Schaper | 280/228 |
| 1,800,123 A | * | 4/1931 | Morris | 280/221 |
| 3,332,704 A | * | 7/1967 | McVicker | 280/228 |
| 4,334,695 A | * | 6/1982 | Ashby | 280/228 |
| 4,761,014 A | * | 8/1988 | Huang | 280/258 |
| 6,079,724 A | * | 6/2000 | Lin | 280/221 |
| 6,334,838 B1 | * | 1/2002 | Lee | 482/51 |
| 6,499,751 B1 | * | 12/2002 | Beleski, Jr. | 280/87.041 |
| 6,505,845 B1 | * | 1/2003 | Fong | 280/228 |
| 6,511,087 B1 | * | 1/2003 | Fong | 280/228 |
| 6,588,784 B1 | * | 7/2003 | Chen | 280/221 |
| 6,659,486 B2 | * | 12/2003 | Eschenbach | 280/221 |
| 6,688,624 B2 | * | 2/2004 | Christensen et al. | 280/255 |
| 2002/0105160 A1 | * | 8/2002 | Yen | 280/252 |
| 2002/0158440 A1 | * | 10/2002 | Graf | 280/258 |
| 2002/0195787 A1 | * | 12/2002 | Tuch | 280/87.041 |
| 2003/0042059 A1 | * | 3/2003 | Tsai | 180/181 |
| 2003/0090076 A1 | * | 5/2003 | Beleski | 280/87.041 |
| 2003/0234507 A1 | * | 12/2003 | Jeng | 280/228 |
| 2004/0032105 A1 | * | 2/2004 | Tsai | 280/87.041 |

* cited by examiner

Primary Examiner—James A. Shriver, II
Assistant Examiner—J. Allen Shriver
(74) Attorney, Agent, or Firm—Alan F Kamrath; Nikolai & Mersereau, P.A.

(57) ABSTRACT

A scooter includes a body having four pulleys at four corners of the body. A wire reeves through the pulleys. A head tube is connected to the body, and a handlebar stem with a front wheel rotatably extends through the head tube. A rear wheel is connected to the rear part. Two pedals are fixedly connected to the wire, and toothed belts extend through the pedals. Each pedal has two wheel sets. Each wheel set has a shaft on which a one-way bearing is mounted. A gear is connected on the the one-way bearing and is engaged with the toothed belts. Wheels of the wheel sets contact the ground, and the scooter moves by reciprocally shifting the pedals on the toothed belts.

5 Claims, 7 Drawing Sheets

US 6,840,524 B2

SCOOTER HAVING RECIPROCATING PEDALS

FIELD OF THE INVENTION

The present invention relates to a scooter which has two reciprocating pedals connected by a wire and drive wheels connected to the pedals.

BACKGROUND OF THE INVENTION

A conventional and popular scooter is shown in FIG. 7 and generally includes a deck 40 with a rear wheel set 42, and a connection mechanism 44 on a front end of the deck 40. A head tube 45 is connected to the connection mechanism 44, and a handlebar stem 43 is rotatably connected to the head tube 45. A front wheel 41 is connected to a lower end of the handlebar stem 43, and a handlebar is connected to a top end of the handlebar stem 43. The user has to step one foot on the deck 40 and pushes the other foot on the ground to move the scooter forward. The foot on the deck 40 often feels exhausted, because it has to bear the weight of the body and keep balance during moving. Most of the users use a specific foot on the deck 40 so that only one foot is exercised by kicking and pushing against the ground. Some people cannot operate the scooter properly, because it requires good balance sense. Some people do not prefer to use the scooter, because only one leg is exercised.

The present invention intends to provide a scooter which is driven by two pedals which are operated reciprocally by two feet.

SUMMARY OF THE INVENTION

In accordance with one aspect of the present invention, there is provided a scooter which comprises a body having a central frame 200, a front part and a rear part respectively connected to the central frame 200, a connection bar 100 connected to a front end of the central frame 200, a head tube 10 connected to the connection bar 100, a handlebar stem 12 rotatably extending through the head tube 10, a front wheel 11 connected to a lower end of the handlebar stem 12, a handlebar connected to a top end of the handlebar stem 12, a rear wheel 13 connected to the rear part, with each of the front part and the rear part having two pulleys 21 on two ends thereof, a wire reeving through the pulleys 21, two toothed belts 23 connected between the front part and the rear part, and two pedals 3 fixedly connected to the wire 22 and located on two sides of the central frame 200, with each pedal 3 having two wheel sets 33, with each wheel set 33 having a shaft 330, a one-way bearing 332 mounted to each of the shafts 330 and connected to a gear 331 on the shaft 330, and two wheels 333 connected at two ends of each shaft 330, with the gears 331 of the two wheel sets 33 engaged with the toothed belts 23.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
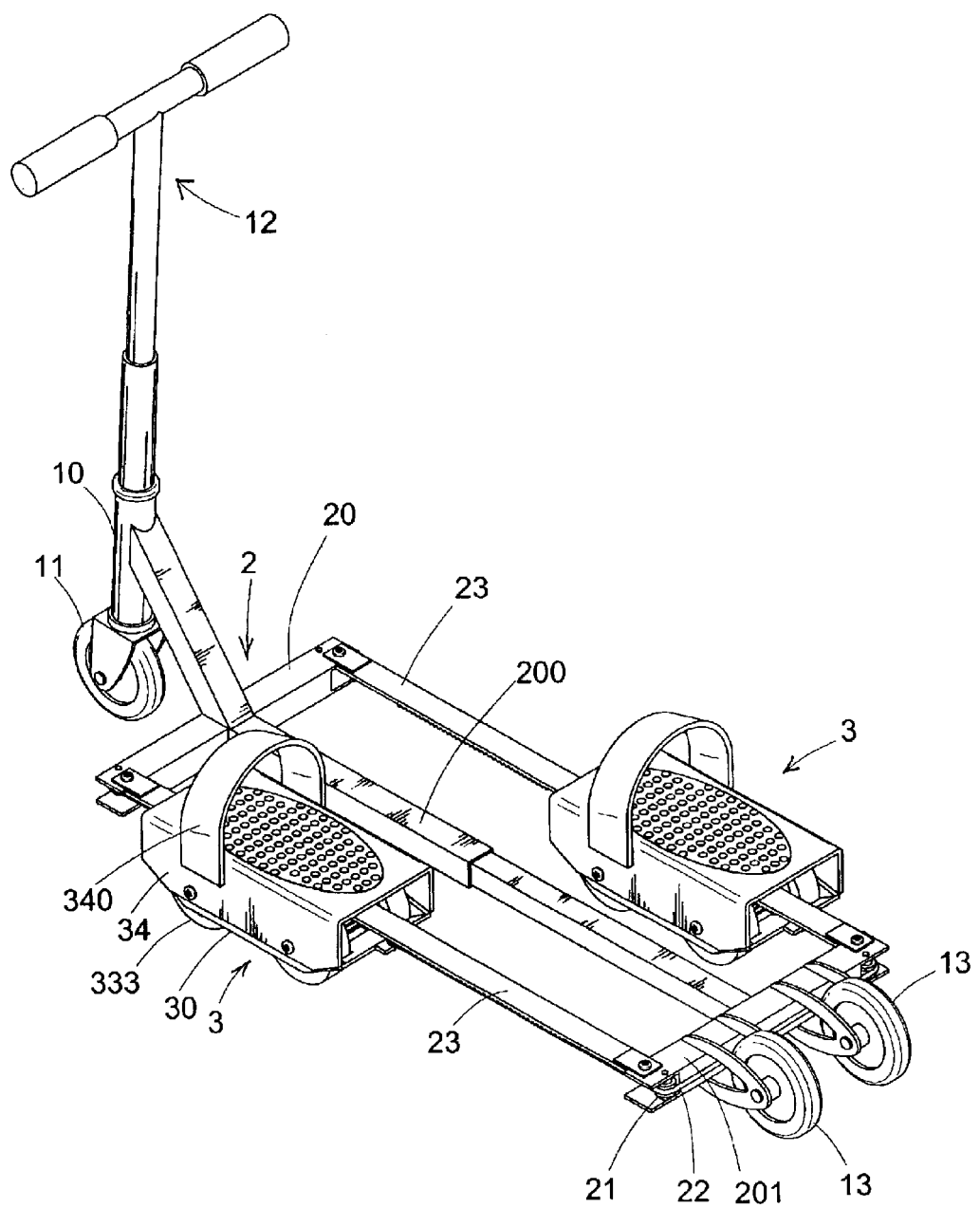
FIG. 1 is a perspective view of the scooter of the present invention.
Figure 2:
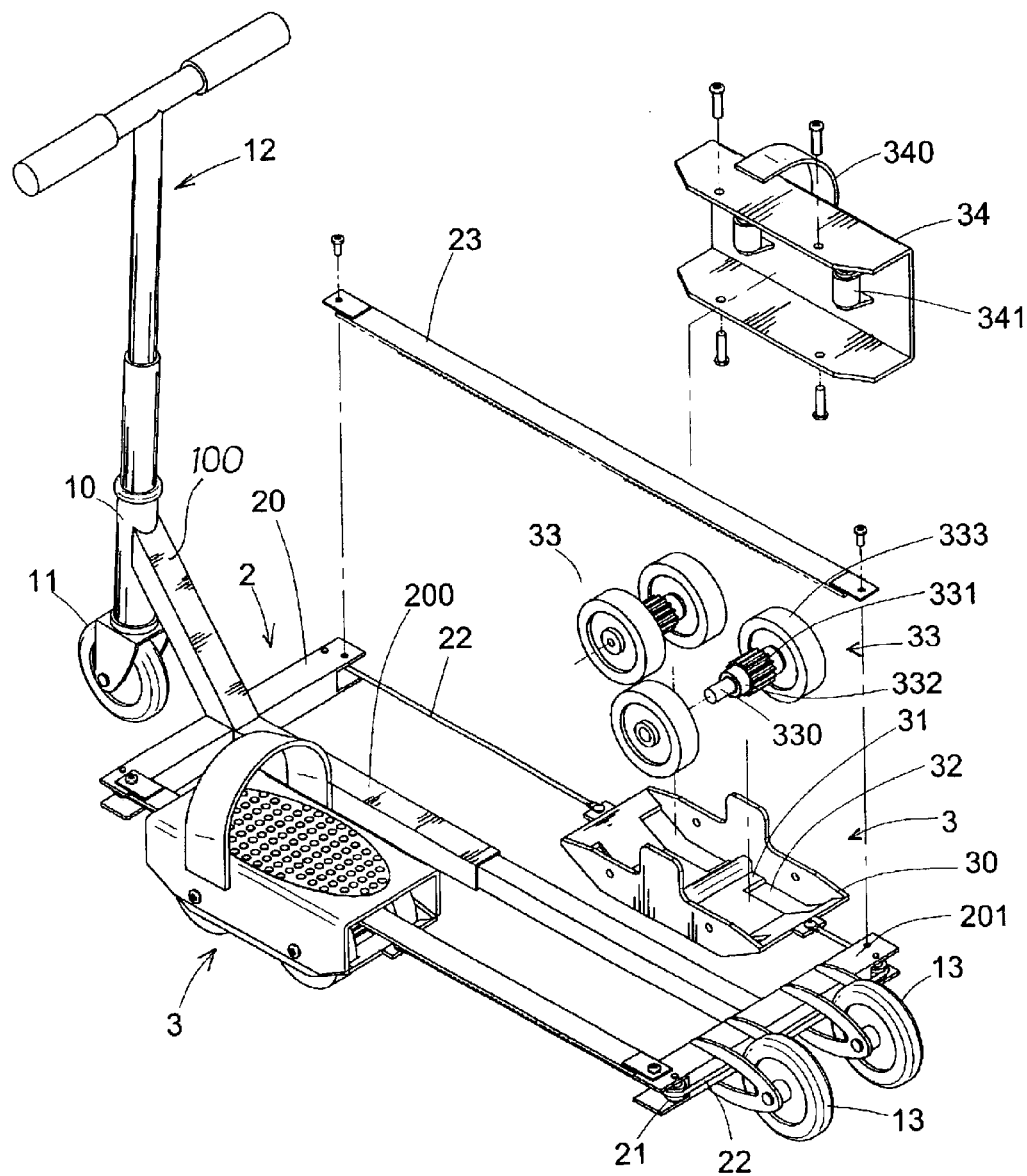
FIG. 2 is an exploded view of the scooter of the present invention.
Figure 3:
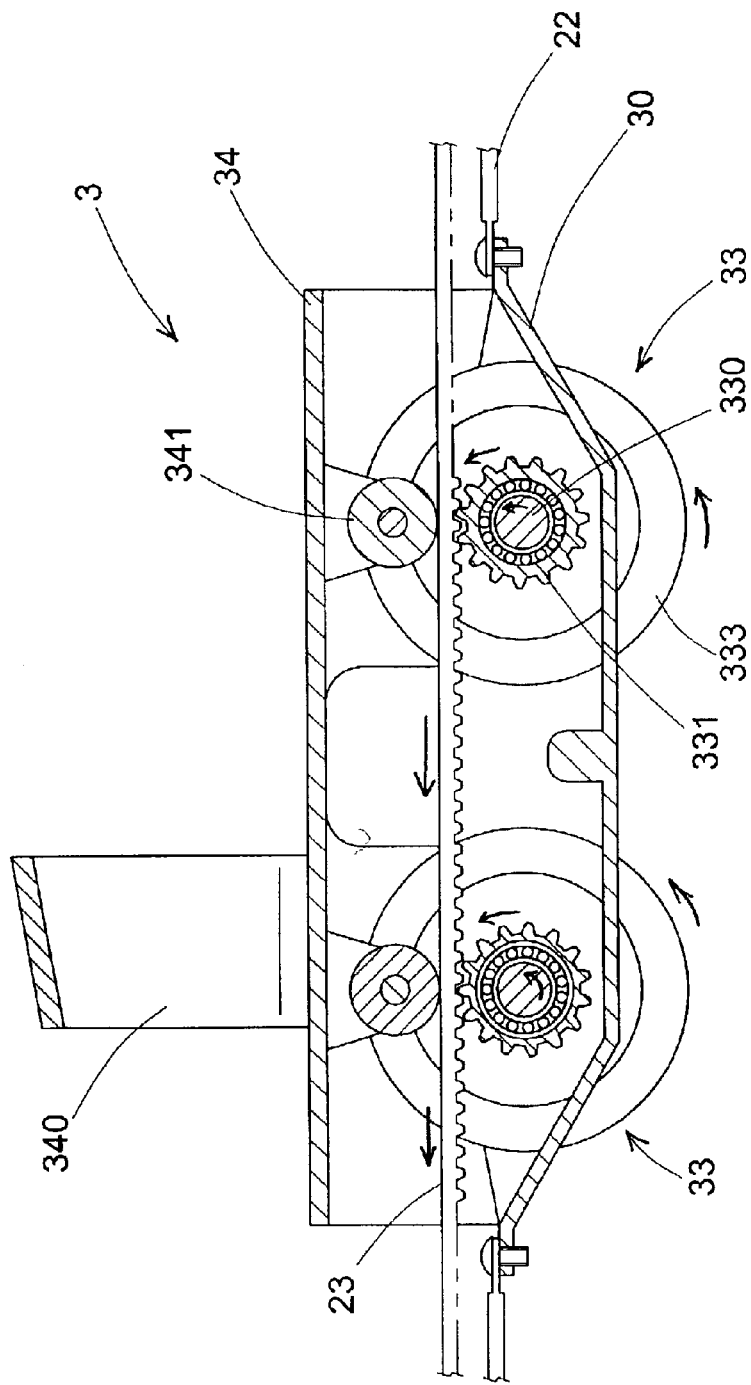
FIG. 3 is a side cross sectional view of the interior structure of each pedal.

Referring to FIGS. 1 to 3, the scooter of the present invention comprises a body 2 having a central frame 200. A front part 20 and a rear part 201 are respectively connected to the central frame 200. A connection bar 100 is connected to a front end of the central frame 200, and a head tube 10 is connected to the connection bar 100. A handlebar stem 12 rotatably extends through the head tube 10. A front wheel 11 is connected to a lower end of the handlebar stem 12, and a handlebar is connected to a top end of the handlebar stem 12. A rear wheel 13 is connected to the rear part 201.

Each of the front part 20 and the rear part 201 has two pulleys 21 on two ends thereof, and a wire 22 reeves through the pulleys 21 so that the wire 22 encloses a rectangular area. Two long sides of the rectangular area enclosed by the wire 22 are parallel to the central frame 200 which is located between the two long sides of the rectangular area. Two toothed belts 23 are connected between the front part 20 and the rear part 201, and are respectively located above the wire 22 of the long sides of the rectangular area.

Two pedals 3 are fixedly connected to the wire 22, and each pedal 3 includes a base 30 and a top part 34 which is mounted on the base 30. Each toothed belt 23 extends between the base 30 and the top part 34. Two wheel sets 33 are received in the space 31 in each pedal 3. Each wheel set 33 has a shaft 330, a one-way bearing 332 mounted to each of the shafts 330 and connected to a gear 331 on the shaft 330, and two wheels 333 connected at two ends of each shaft 330. The gears 331 of the two wheel sets 33 are engaged with the toothed belts 23. Each pedal 3 further has two pressing rollers 341 connected to an under side of each top part 34 so as to press on a top plain surface of each of the toothed belts 23. Four slots 32 are defined through each of the bases 30 so that the wheels 333 extend through the slots 32 and contact the ground. A positioning strip 340 is connected to a top of each of the top parts 34.

Figure 4:
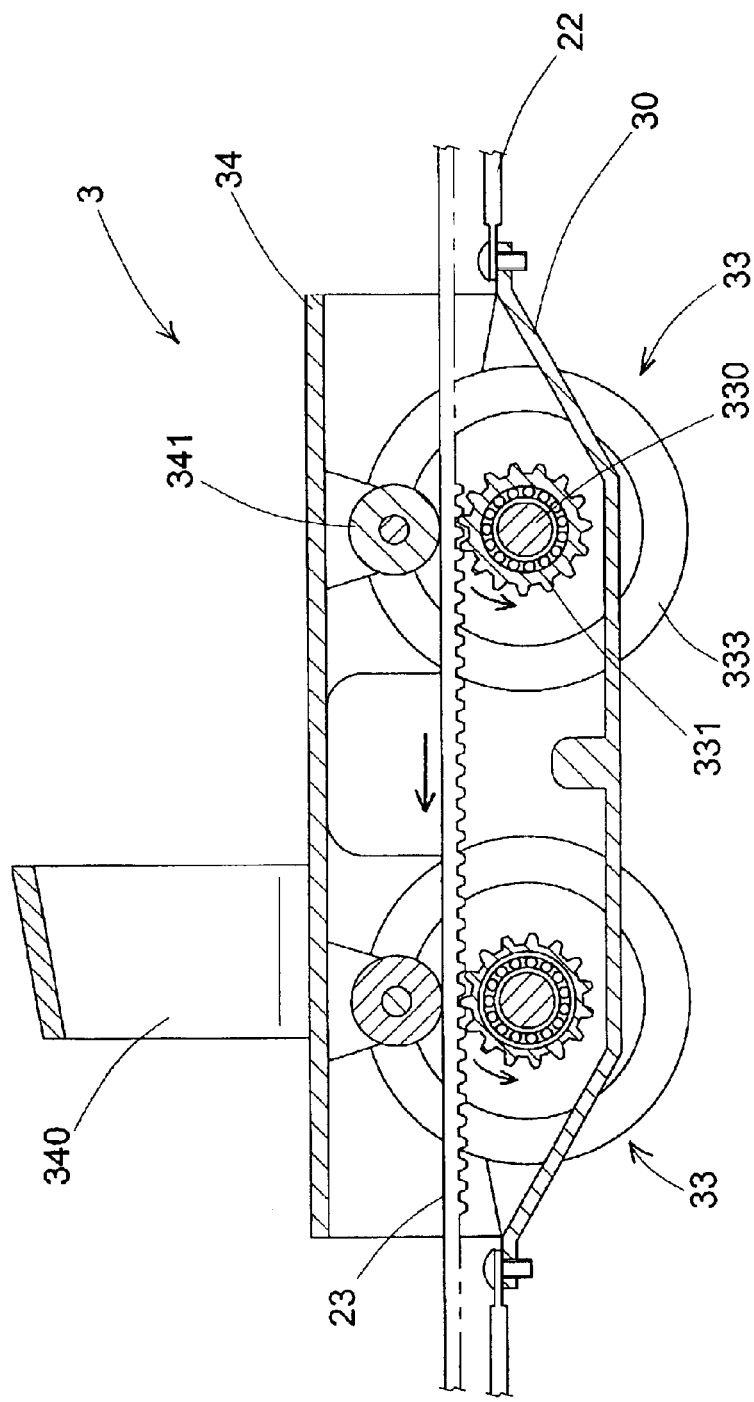
FIG. 4 is a side cross sectional view of the wheels rotatable by engaging the gears with the toothed belts.
Figure 5:
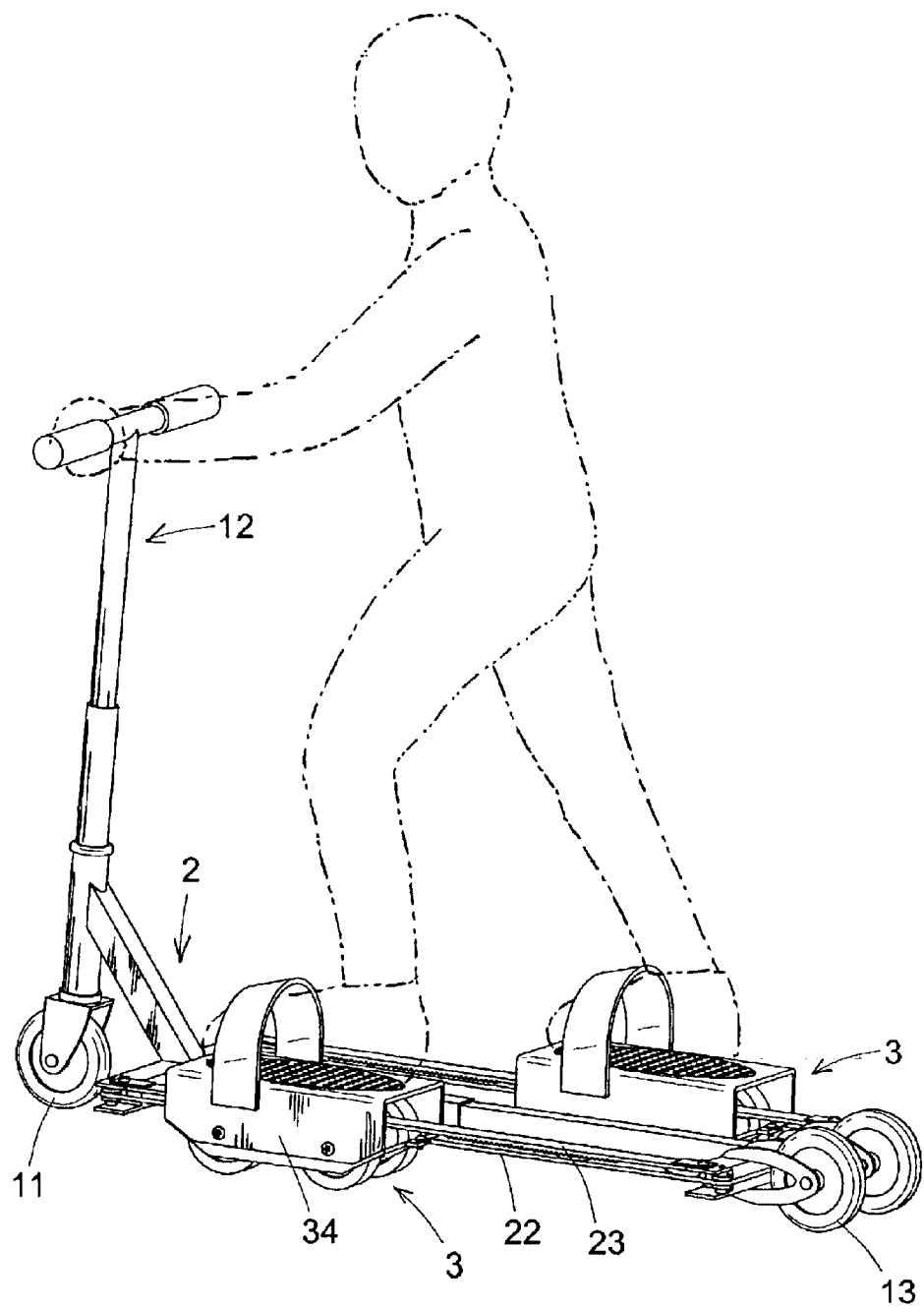
FIG. 5 shows the operation of the scooter by a user.
Figure 6:
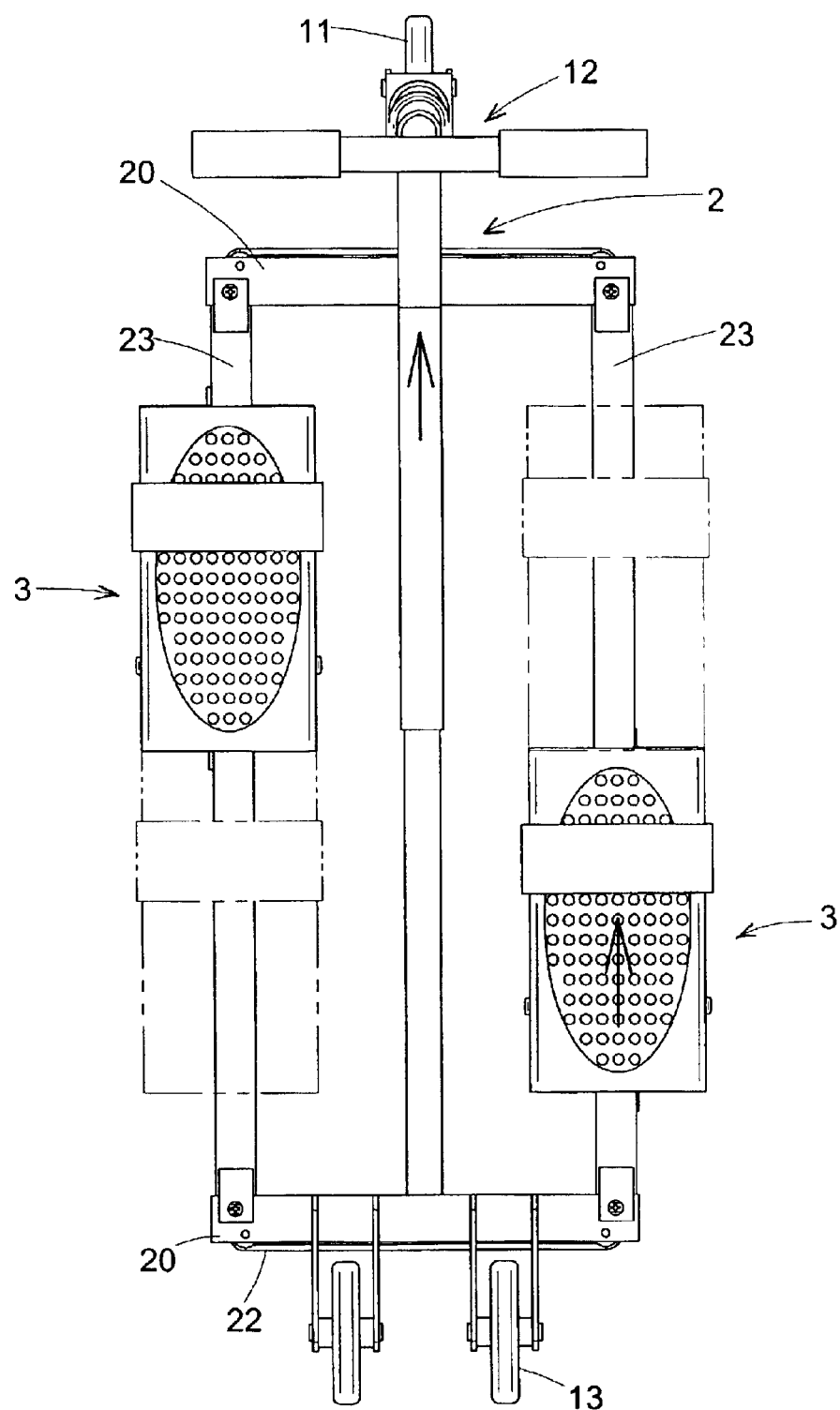
FIG. 6 shows a top view of the scooter of the present invention.
Figure 7:
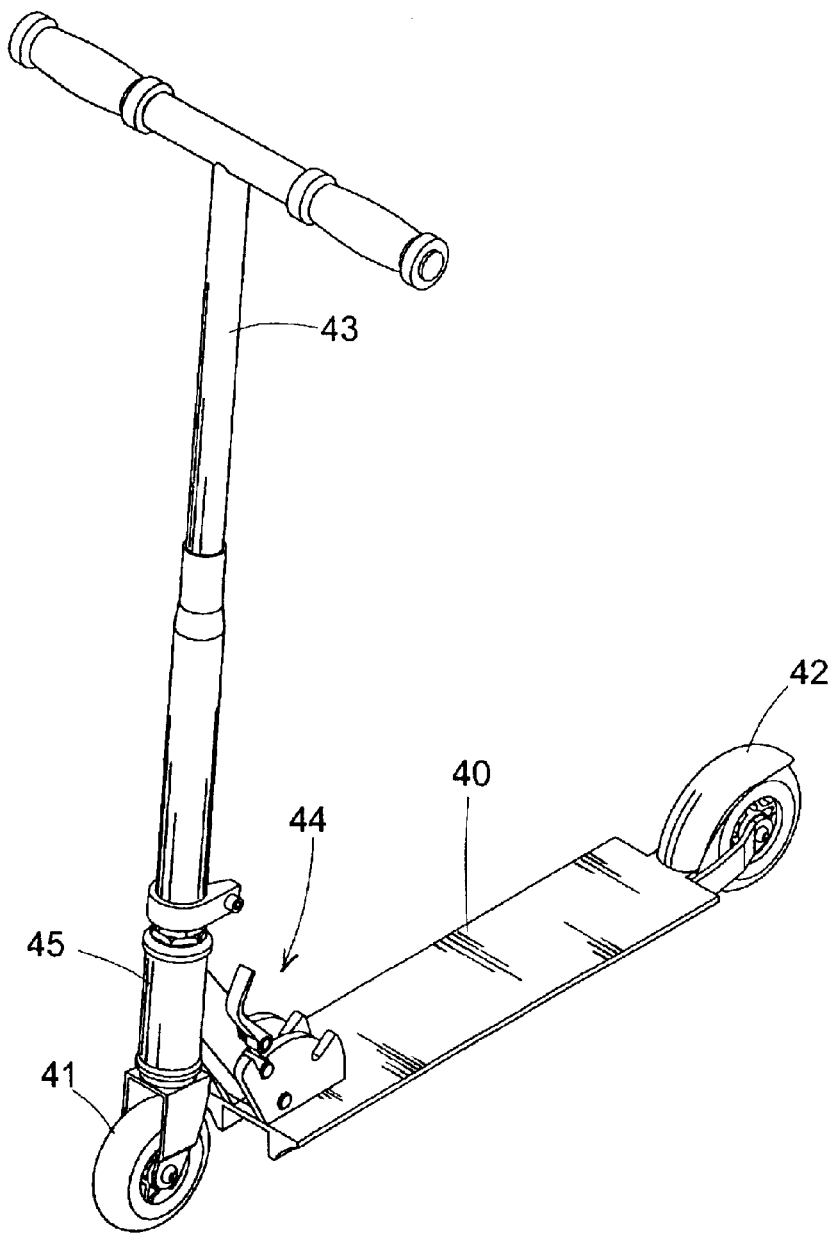
FIG. 7 shows a conventional scooter.

Referring to FIGS. 4 to 6, the user may insert his or her feet into the space between the top part 34 and the positioning strip 340 and alternatively and reciprocally moves the two pedals 3. The one-way bearings 332 allow the shaft 330 together with the wheels 333 to rotate counter clockwise as shown in FIG. 4 to move the scooter forward, and when the pedals 3 are moved rearward, the one-way bearings 332 are rotated independently from the shaft 330. By this operation, the two legs of the user are exercised, and the scooter can be moved under a stable condition.

While we have shown and described the embodiment in accordance with the present invention, it should be clear to those skilled in the art that further embodiments may be made without departing from the scope of the present invention.

What is claimed is:

1. A scooter comprising:

a body having a connection bar connected to a front end thereof, a head tube connected to the connection bar, a handlebar stem rotatably extending through the head tube, a front wheel connected to a lower end of the handlebar stem, a handlebar connected to a top end of the handlebar stem, a rear wheel connected to a rear end of the body, four pulleys connected to the body, a wire reeving through the pulleys, two toothed belts connected to the body and located above the wire, and two pedals fixedly connected to the wire, with each pedal having two wheel sets and each wheel set having a shaft, a one-way bearing mounted to each of the shafts and connected to a gear on the shaft, and two wheels connected at two ends of each shaft, with the gears of the two wheel sets engaged with the toothed belts.

2. The scooter as claimed in claim 1, wherein the body includes a central frame, a front part and a rear part respectively connected to two ends of the central frame, each of the front part and the rear part having two of the four pulleys on two ends thereof, with the central frame located between the two pedals.

3. The scooter as claimed in claim 1, wherein each pedal includes a base and a top part which is mounted on the base, with each toothed belt extending between the base and the top part, and two pressing rollers connected to an under side of each top part so as to press on a top plain surface of each of the toothed belts.

4. The scooter as claimed in claim 3, wherein a positioning strip is connected to a top of each of the top parts.

5. The scooter as claimed in claim 3 further comprising four slots defined through each of the bases so that the wheels extend through the slots and are adapted to contact the ground.

* * * * *